Patented Dec. 23, 1930

1,786,131

UNITED STATES PATENT OFFICE

WILHELM SCHULZE, OF MICHIGAN CITY, INDIANA

POTATO-HARVESTING MACHINE

Application filed April 27, 1928. Serial No. 273,250.

The invention relates to a harvesting machine and more especially to a machine for harvesting or digging potatoes.

The object of the invention is to provide a machine adapted to dig the potatoes out of the ground and conduct the potatoes together with the foliage and such parts of ground as adhere to the potatoes into a revolving drum where the ground and dirt is for the most part removed from the potatoes.

A further object of the invention is to provide a potato digging machine having an apparatus adapted to remove practically all of the stem and leaves from the potatoes proper and collect the potatoes after being separated from the refuse.

Other objects of the invention not specifically stated may be easily ascertained and understood from the following specification in connection with the accompanying drawings forming a part thereof.

It is however to be noted that the invention is not to be limited or restricted to the exact construction and formation shown in the drawings and described in the specification, but that the invention is only to be limited by the scope of the claim appended hereto.

In the drawings illustrating a preferred embodiment of the invention:

Figure 1:
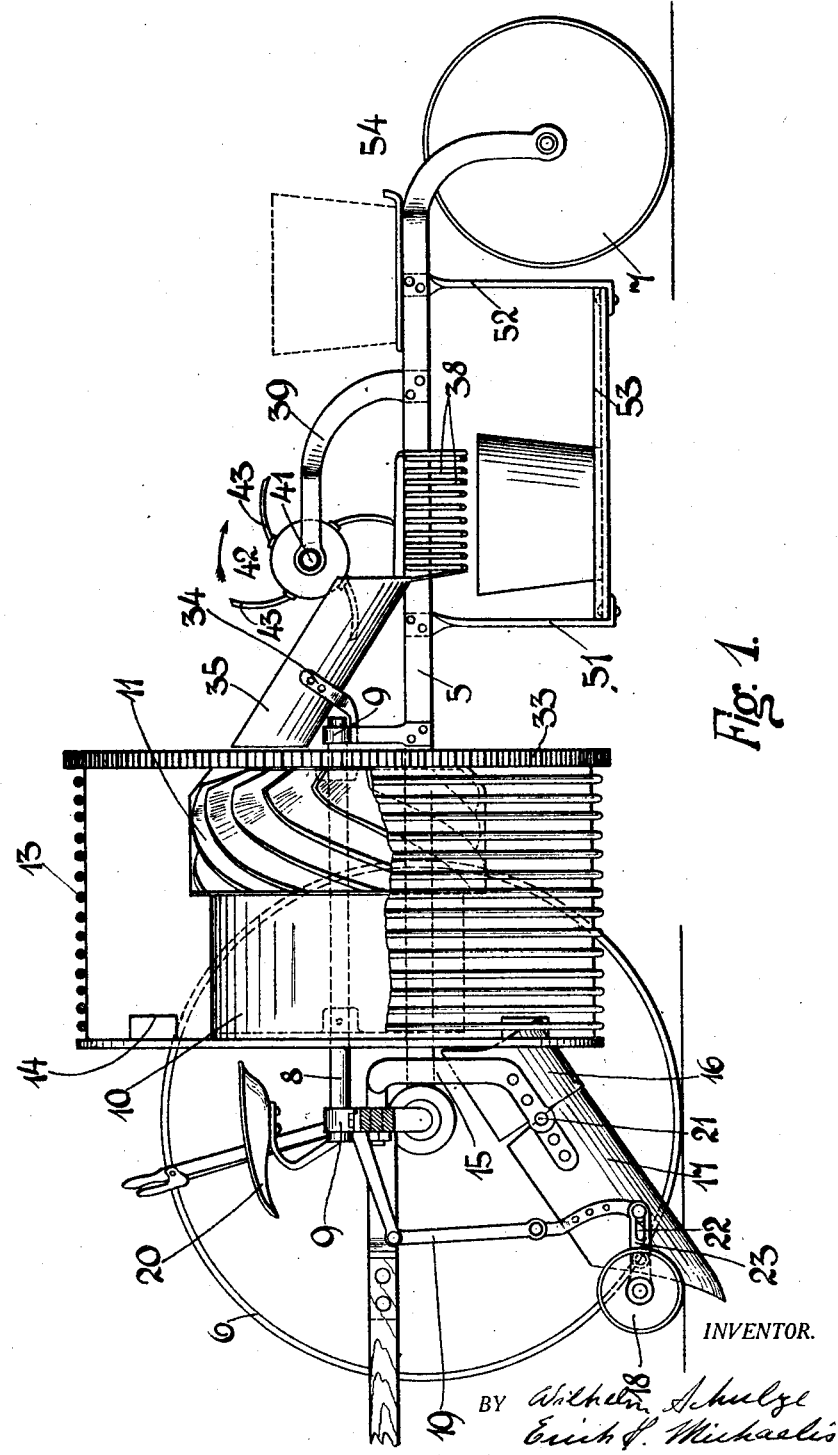
Fig. 1 is a side view of the invention, partly shown in section.

The potato digging machine has a frame 5 and preferably two front wheels 6 and a rear wheel 7. A shaft 8 is journaled in bearings 9 which are supported upon the frame 5 and are arranged in such a manner that the shaft 8 extends longitudinally of the machine and is located in the longitudinal center thereof. A small guide drum 10 is rigidly fastened to the shaft 8. The front portion of this drum is smooth as shown in Fig. 1, while the rear portion has a somewhat bigger diameter, and guide plates 11 extend spirally over the whole surface of this rear part, so that guide ways will be formed between said plates.

Dividing plates 12 extend from the small drum outwardly in radial direction. A plurality of rings 13 made from steel or iron bars form the outside of the big separating drum as shown especially in Figs. 1 and 2. In the front edge of each of the separating plates 12, a notch 14 is cut for a purpose to be explained later on. A bracket 15 fastened to the frame 5 of the machine carries a short metal chute 16, the upper part whereof extends so far backward that it reaches into the big separating drum and in order to make this possible, it is necessary to provide the notches 14 in the separating plates 12 as clearly shown in Fig. 1. To the fore part of the bracket 15 a second chute 17 is movably joined. The front part of said chute member is, as shown in Fig. 1, sharpened and extends in such a manner that it may be forced into the ground in order to dig the potatoes. Two wheels 18 are fastened to the chute member 17, one at each side thereof, in such a manner that the wheels will always stay on top of the ground guiding the digging member while permitting a depth adjustment of said member. In order to adjust the depth a train of levers 19 is provided, the lowest whereof, is fastened to the digging member 17 and the uppermost whereof is arranged adjacent the driver's seat 20 supported by the frame of the machine. Fig. 1 shows clearly that the digging member 17 may be swung about the fulcrum 21 in the end of the bracket 15 by adjusting the train of levers 19 while at the same time the wheels 18 may remain at the same height on account of their movable connection, by means of the slot 22 in the connection piece 23 extending from the lowermost lever to the wheel.

The wheels 6 are rotatably mounted on the front axle 24. Adjacent the left front wheel 6 a bevel gear 25 is mounted upon the front axle and fastened to the front wheel in such a manner that it will rotate with said wheel. A shaft 26 is journaled in bearings 27 fastened to the left hand longitudinal part of the frame 5 and said shaft carries at its rear end a spur gear 28 while the forward end is connected by means of a universal joint 29 to a second shaft 30, the forward end whereof is journaled in a bearing 31 supported by the front axle. This second shaft carries a bevel gear 32 meshing with the first mentioned bevel gear 25. A big spur gear 33 is fastened to the separating drum and meshes with the spur gear 28.

A bracket 34 is supported by the rear bearing 9 and holds a chute 35 extending downwardly from the rear end of the separating drum. This chute 35 has two side walls 36 extending downwardly and inwardly towards each other and the bottom of this chute consists of iron or steel bars 37 arranged at distances from each other. On the lowest place a third chute extends sidewardly and downwardly and the bottom of this chute consists also of bars 38 arranged at distances from each other as can be clearly seen in Fig. 2. A bracket 39 is fastened to the left hand longitudinal member of the frame 5 and extends inwardly and forwardly in said frame while on the right hand longitudinal frame member a second bracket 40 is fastened and extends forwardly. A shaft 41 extends crosswise of the machine and is supported by and journaled in the said two brackets. Arranged above the chute 35 the shaft 41 carries a drum 42 and a plurality of claws 43 are fastened to said drum in such a manner that the claws will extend between the rods forming the bottom of the chute 35 when the drum is rotated. Adjacent the bracket 40 a bevel gear 44 is mounted on the shaft 41. Adjacent the right hand front wheel 6 a bevel gear 45 is mounted on the front axle and so connected with said front wheel that it will rotate therewith. A bearing 46 is mounted on said front axle, adjacent said bevel gear and another bearing 47 is fastened to the right hand longitudinal frame member adjacent the above mentioned bevel gear 44. A shaft 48 is journaled in said two bearings, and a bevel gear 49 is mounted adjacent the forward end of said shaft and meshes with the bevel gear 45, and a bevel gear 50 is mounted on the rearward end of said shaft and meshes with the bevel gear 44 on the shaft 41.

On the left hand frame member hangers 51 and 52 are fastened and extend downwardly therefrom and carry a platform 53 adapted to support a bucket or the like in such a manner that the bucket will be standing right underneath the outward ends of the bars 38 forming the bottom of the last chute. Across the rearward end of the frame a ledge board 54 may be arranged in order to carry a plurality of buckets or the like.

Figure 2:
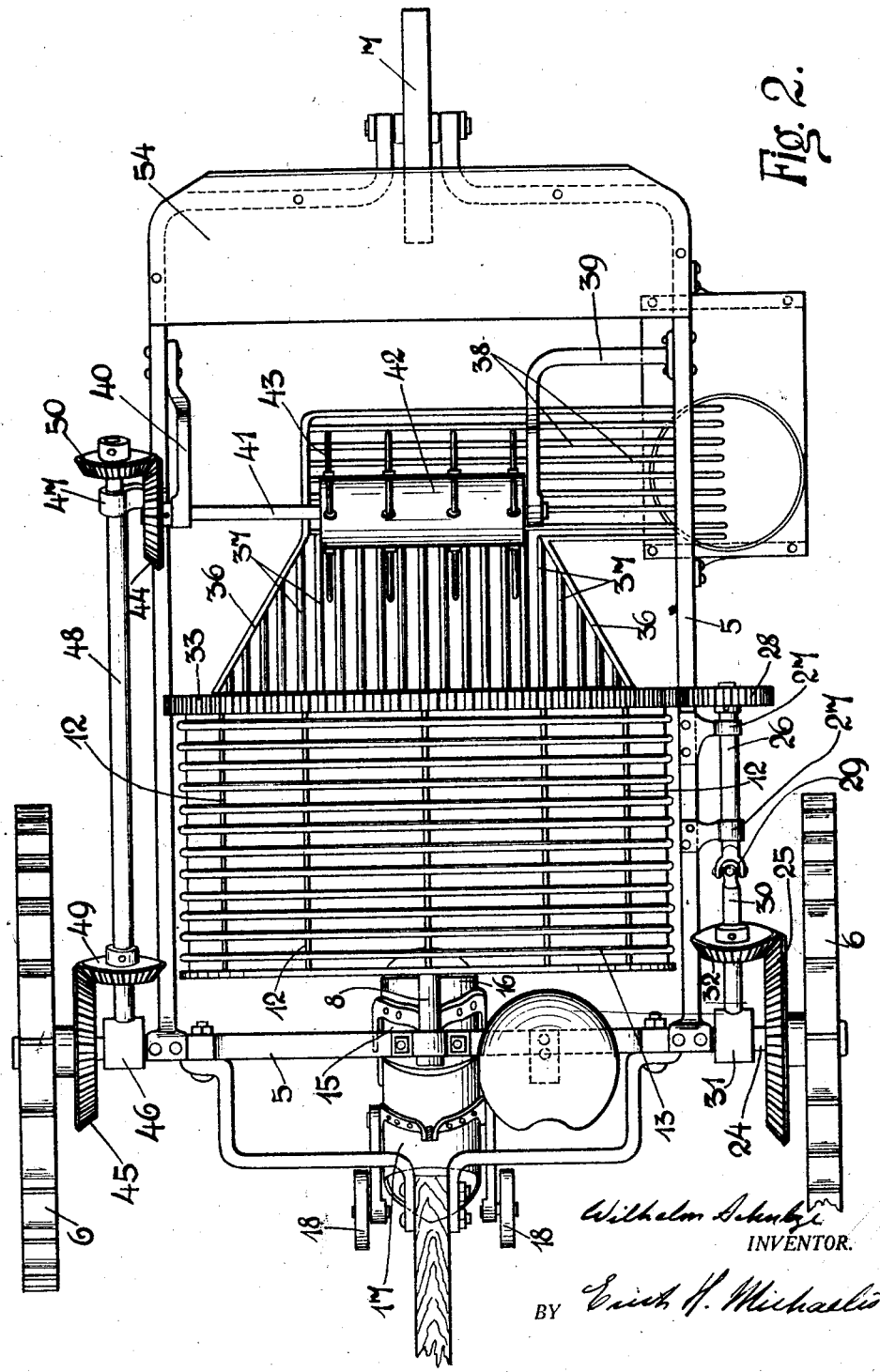
Fig. 2 is a top view of the machine according to the invention and Fig. 3 is an end view thereof.
Figure 3:
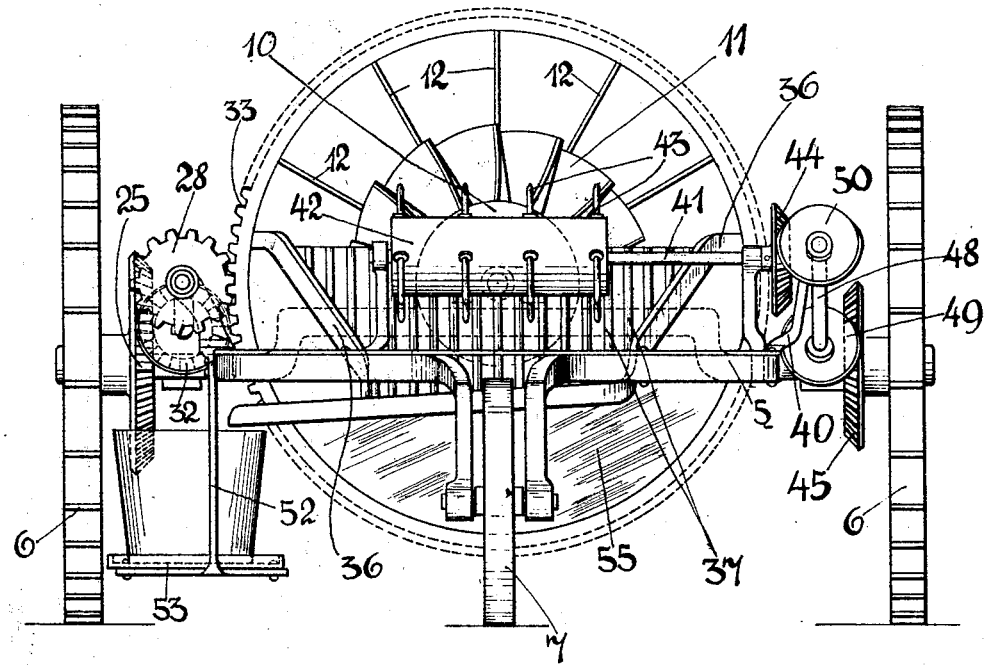

The machine is operated as follows:

The operator takes his seat on the driver's place. It is to be understood that this apparatus may be driven by means of horses (as indicated in drawings) or by means of a motor or the like. The operator adjusts the digging member 17 to the depth desired by means of the train of levers 19 and when the machine is moved forward the digging member will dig underneath the potatoes which will be forced upwardly over the whole digging member 17 and the short chute 16. While the vehicle is moved forward, the separating drum will be rotated by means of the bevel gear 25 and the bevel gear 32 and the spur gears 28 and 33 so that the potatoes and everything connected therewith or hanging thereon, that will slide over the chute 16, will fall into the separate compartments of the separating drum formed by the dividing plates 12. The potatoes, the dirt thereon, stems and foilage will be carried upwardly in the dividing drum and will finally fall onto the small guiding drum. Through this movement all the dirt or at least most of it will be separated from the potatoes and will fall between the rings 13 forming the outer circumference of the separating drum. The potatoes and stems and foilage thereof will finally get onto the guide ways between the guide plates 11, and in consequence of the spiral formation thereof, the potatoes will be guided onto the chute 35 which as indicated in Figure 2 extends practically over the whole width of the upper portion of the separating drum. It may be mentioned here that a plate 55 protects the lower rear end of the separating drum and prevents any potatoes from falling out therefrom. The chute 35 extends downwardly at such an angle that the potatoes and the foilage thereof will slide downwardly on the bars 37 forming the bottom of said chute.

When the vehicle is moved forwardly the drum 42 is rotated by means of the bevel gear 45, bevel gear 49, shaft 48 and the bevel gears 50 and 44 and the shaft 41. When the drum is rotated in this manner the claws 43 will reach from below into the mass of foilage, etc., sliding down on the chute and will lift up the foilage and shake off the potatoes hanging thereon. The potatoes will fall on the chute again and will roll further down on the bars 38 and will be collected that way in the bucket supported by the platform 53. When this bucket is filled it may be easily removed and replaced by another bucket, one of those carried on the ledge board 54.

What I claim as new and desire to secure by Letters Patent is:

In a device of the class described, a chute consisting of a relatively stationary rear portion and an adjustable forepart, the latter being adapted to dig potatoes out of the ground, a revolving drum, spaced apart rings forming the circumference of the drum, a guide drum arranged in said first mentioned drum and revolving therewith, dividing plates extending from the guide drum to said rings and dividing the space between said rings and said drum into a plurality of compartments adapted to receive potatoes, means on said guide drum for guiding the potatoes out of said first drum, an inclined chute, a plurality of bars forming the bottom of said chute and extending longitudinally thereof, said chute being arranged to receive the potatoes from the revolving drum, a second revolving drum, a plurality of claws on said drum and adapted to reach from below between the bars forming the bottom of the inclined chute, a second inclined chute extending at right angles to the first mentioned chute, and a receptacle positioned underneath and at the end of said chute.

In witness whereof I affix my signature.

WILHELM SCHULZE.